US009830248B2

(12) United States Patent
Potti et al.

(10) Patent No.: US 9,830,248 B2
(45) Date of Patent: Nov. 28, 2017

(54) SYSTEM FOR AUTOMATED CODE VALIDATION AND DEPLOYMENT

(71) Applicant: BANK OF AMERICA CORPORATION, Charlotte, NC (US)

(72) Inventors: Nikhil Kumar Potti, Telangana (IN); Yash Pant Dashputra, Telangana (IN); Kiran Kumar Kolla, Telangana (IN); Siva Prasad Vadrevu, Telangana (IN); William Edison Spears, Nebo, NC (US); Dari A. McKenzie, Weddington, NC (US); Jeffrey W. Campbell, Charlotte, NC (US); Norman Wesley Anderson, Mint Hill, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 31 days.

(21) Appl. No.: 15/058,709

(22) Filed: Mar. 2, 2016

(65) Prior Publication Data
US 2017/0255542 A1 Sep. 7, 2017

(51) Int. Cl.
*G06F 9/445* (2006.01)
*G06F 11/36* (2006.01)
(52) U.S. Cl.
CPC ............ *G06F 11/3604* (2013.01); *G06F 8/60* (2013.01); *G06F 8/61* (2013.01)
(58) Field of Classification Search
None
See application file for complete search history.

(56) References Cited

U.S. PATENT DOCUMENTS

| 2008/0201702 A1* | 8/2008 | Bunn | G06F 8/67 717/171 |
| 2011/0296393 A1* | 12/2011 | Vidal | G06F 8/453 717/171 |
| 2014/0130036 A1* | 5/2014 | Gurikar | G06F 8/61 717/176 |

* cited by examiner

*Primary Examiner* — Lewis A Bullock, Jr.
*Assistant Examiner* — Mark Gooray
(74) *Attorney, Agent, or Firm* — Michael A. Springs; Moore & Van Allen PLLC; James C. Edwards

(57) ABSTRACT

The present invention provides for a consolidated interface for flexible and customizable code deployment. Specifically, a centralized interface for management and automation of all phases of code deployment; including, but not limited to, code validation, validation approval, code deployment and data reporting/auditing. Code is automatically validated regardless of which standards or regulations apply to the programs/entities, platforms and/or applications associated with a code deployment. In addition, any known, or future known, code deployment tool and/or reporting/auditing tool may be used to conduct the deployment/migration and/or provide requisite reporting. Additionally, the systems herein disclosed are capable of integrating with any new/future platform, new/future software applications/packages and/or updates/revisions to applications/software packages without having to modify or reconfigure the disclosed system.

20 Claims, 3 Drawing Sheets

US 9,830,248 B2

SYSTEM FOR AUTOMATED CODE VALIDATION AND DEPLOYMENT

FIELD

In general, embodiments of the invention relate to a system for computer code validation and deployment, more specifically, a multi-component system that can adapt to any code validation/migration, including scripted code, as well as any applications, versions or platforms.

BACKGROUND

In large enterprises the validation and deployment of computer code is problematic. Many different tools (i.e., applications, software packages and the like) exist; however, such tools are typically limited to one facet of code deployment. For example, specific tools exist for (i) code deployment and/or method of deployment, (ii) code validation and/or platform stability and (iii) code deployment reporting and/or auditing. In general, specific tools are needed to address specific deployment rules and requirements as dictated by different tasks/entities within an enterprise.

Currently specific code deployment/migration tools/applications are limited to deployment on specific platforms (i.e., specific operating systems, specific computing devices, such as specific types of servers or the like) and/or updating or revising specific software applications/packages. From a user perspective, in many instances such specialized deployment/migration tools do afford the user the ability to customize deployment/migration to meet the needs/requirements of a particular entity within an enterprise. From a validation standpoint, each platform and/or software application has its own requirements in terms of which standards must be adhered to. Moreover, in large enterprises that are regulated by both internally and externally (e.g., government regulations), the enterprise must be able track every aspect of the deployment process to insure that standards are complied with and that platforms and/or applications are stable.

In addition, most of the current tools require some level of manual intervention in order to validate, deploy and/or create an auditable code deployment trail. In this regard, it is difficult to centralize the code deployment operation within an enterprise because each of the tools require a specific skill set and/or training, which require users to confer with specific documentation/manuals associated with the individual tools in order to insure that the deployment occurs in compliance with standards and the like. Such highly specialized tool-specific training and tool management requires the enterprise to conduct resource intensive training and create a level of redundancy. Furthermore, when numerous different deployment-related tools/applications are employed, each tool/application can cause instability within a task and/or platform and the manually intensive review/auditing associated with every deployment across multiple tools is inefficient from a time and cost perspective.

Therefore, a need exists to develop a consolidated interface that can add flexibility and customization to the overall code deployment process. The desired systems and the like should provide for management and automation of all phases of code deployment; including, but not limited to, code validation, validation approval, code deployment and data reporting/auditing. As such, the desired systems and the like should be able to automatically validate code regardless of which standards apply to the entities, platforms and/or applications (and application versions/revisions) associated with a given deployment. In addition, the desired systems and the like should provide the user the flexibility to implement whichever code deployment tool and/or reporting/auditing tool that is applicable to a given deployment/migration. Moreover, the desired systems and the like should be capable of being integrated with any new platform, new software applications/packages and/or updates/revisions to applications/software packages without having to modify or reconfigure the existing flexible and customizable system. Additionally, the desired system should be capable of tracking/logging each action/event that occurs throughout the process, so that resulting data provides requisite analysis and audit trails.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for consolidated interface for flexible and customizable code deployment. The present invention provides for centralized management and automation of all phases of code deployment; including, but not limited to, code validation, validation approval, code deployment and data reporting/auditing. In this regard, the present invention is capable of automatically validating code regardless of which internal or external standards apply to the entities, platforms and/or applications associated with a given deployment. In addition, the present invention allows for execution of any known, or future known, code deployment tool (i.e., method of deployment) and/or reporting/auditing tool that is applicable to a given deployment/migration. Additionally, the present invention is capable of integrating with any new/future platform, new/future software applications/packages and/or updates/revisions to applications/software packages without having to modify or reconfigure the disclosed invention. Further the present invention logs/tracks every action/event that occurs throughout the validation and deployment process, so that resulting data provides requisite analysis and audit trails.

An apparatus for computing code validation and deployment defines first embodiments of the invention. The apparatus includes a computing platform having a memory and at least one processor in communication with the memory. The apparatus further includes a computing code validation and deployment module that is stored in the memory and executable by the processor. The module is configured to receive a user request to deploy a code within a computing network and automatically validate the code by applying one or more of a plurality of code validation standards. The standards that are applied are based at least on the tasks, platforms and applications associated with the deployment of the code. The module is further configured to, in response to validation and approval of the validation, automatically deploy the code through execution of one of a plurality of the code deployment tools. The deploying of the code includes queuing and scheduling the code for deployment, and executing a deployment script that is configured to identify the tasks associated with the code deployment, and determine the platforms and the applications associated with the code deployment, and, in accordance with the scheduling, deploy the code across the one more tasks, across the one or more platforms (e.g., operating systems and/or specific computing devices) and the one or more applications.

In specific embodiments of the apparatus, the code validation and deployment module is further configured to log data associated with each action performed by the code validation and deployment module and store the logged data in a code deployment database. In such embodiments of the invention, the code validation and deployment module is further configured to, in response to completion of a code deployment, access the code deployment database to retrieve applicable logged data and, execute one or more of a plurality of code deployment reporting tools to generate and initiate communication of one or more code deployment reports.

In still further embodiments of the apparatus, the code validation and deployment module is further configured to, in response to validating the code, automatically approve the validation of the code based on user selected approval criteria.

In further specific embodiments of the apparatus, the code validation and deployment module is further configured to deploy code to any previously unidentified platforms (e.g., a "new" platform) added to the computing network absent a modification to or reconfiguration of the code validation and deployment module. In similar embodiments of the apparatus, the code validation and deployment module is further configured to deploy code to any previously unidentified applications and previously unidentified versions of applications (e.g., a "new" application or version/revision of an application) absent a modification to or reconfiguration of the code validation and deployment module.

A system for computing code validation and deployment defines second embodiments of the invention. The system includes a plurality of code deployment tools, such as ETL (Extract, Transform and Load) tools or the like and a plurality of code validation standards. The system additionally includes a computing platform having a memory and at least one processor in communication with the memory. In addition, the system includes a code validation and deployment module that is stored in the memory and executable by the processor. The module is configured to receive a user request to deploy a code within a computing network and, in response to receiving the request, automatically validate the code by applying one or more of the plurality of code validation standards. The standards that are applied are based at least on the tasks, platforms and applications associated with the deployment of the code. The module is further configured to, in response to validation and approval of the validation, automatically deploy the code through execution of one of the plurality of code deployment tools. Deploying of the code includes queuing and scheduling the code for deployment, and executing a deployment script that is configured to identify the tasks associated with the code deployment, and determine the platforms and the applications associated with the code deployment, and, in accordance with the scheduling, deploy the code across the one more tasks, across the one or more platforms (e.g., operating systems or computing devices) and the one or more applications.

In specific embodiments the system further includes a code deployment log database. In such embodiments of the system, the code validation and deployment module is further configured to log data associated with actions performed by the code validation and deployment module and store the logged data in the code deployment log database. In further specific embodiments the system includes a plurality of code deployment reporting tools. In such embodiments of the system, the code validation and deployment module is further configured to, in response to completion of a code deployment, access the code deployment database to retrieve applicable logged data and, execute one or more of a plurality of code deployment reporting tools to generate and initiate communication of one or more code deployment reports.

In still further embodiments of the system, the code validation and deployment module is further configured deploy code to any previously unidentified platforms (e.g., "new" platforms) added to the computing network absent a modification to the code validation and deployment module. In similar embodiments of the system, the code validation and deployment module is further configured to deploy code to any previously unidentified applications and previously unidentified versions of applications (e.g., a "new" application or version/revision of an application) absent a modification to or reconfiguration of the code validation and deployment module.

A computer program product including a non-transitory computer-readable medium defines third embodiments of the invention. The computer-readable medium includes a first set of codes for causing a computer to receive a user request to deploy a code within a computing network. In addition, the computer-readable medium includes a second set of codes for causing a computer to automatically validate the code by applying one or more of a plurality of code validation standards. The standards that are applied are based at least on the tasks, platforms and applications associated with the deployment of the code. Additionally, the computer-readable medium includes a third set of codes for causing a computer to, in response to validation and approval of the validation, automatically deploy the code through execution of one of a plurality of code deployment tools. Deploying the code includes (i) queuing and scheduling the code for deployment, and (ii) executing a deployment script that is configured to identify the tasks associated with the code deployment, and determine the platforms and the applications associated with the code deployment, and, in accordance with the scheduling, deploy the code across the one more tasks, across the one or more platforms and the one or more applications.

Thus, systems, apparatus, methods, and computer program products herein described in detail below provide for a unified interface for flexible and customizable computing code validation and deployment. The present invention provides for centralized management and automation of all phases of code deployment; including, but not limited to, code validation, validation approval, code deployment and data reporting/auditing. In this regard, the present invention is capable of automatically validating code regardless of which standards apply to the entities, platforms and/or applications associated with a given deployment. Moreover, the present invention is able to incorporate and execute any known deployment method, i.e., any known code deployment tool and deploy the code across any task/entity, any platform and any application/revision of an application.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
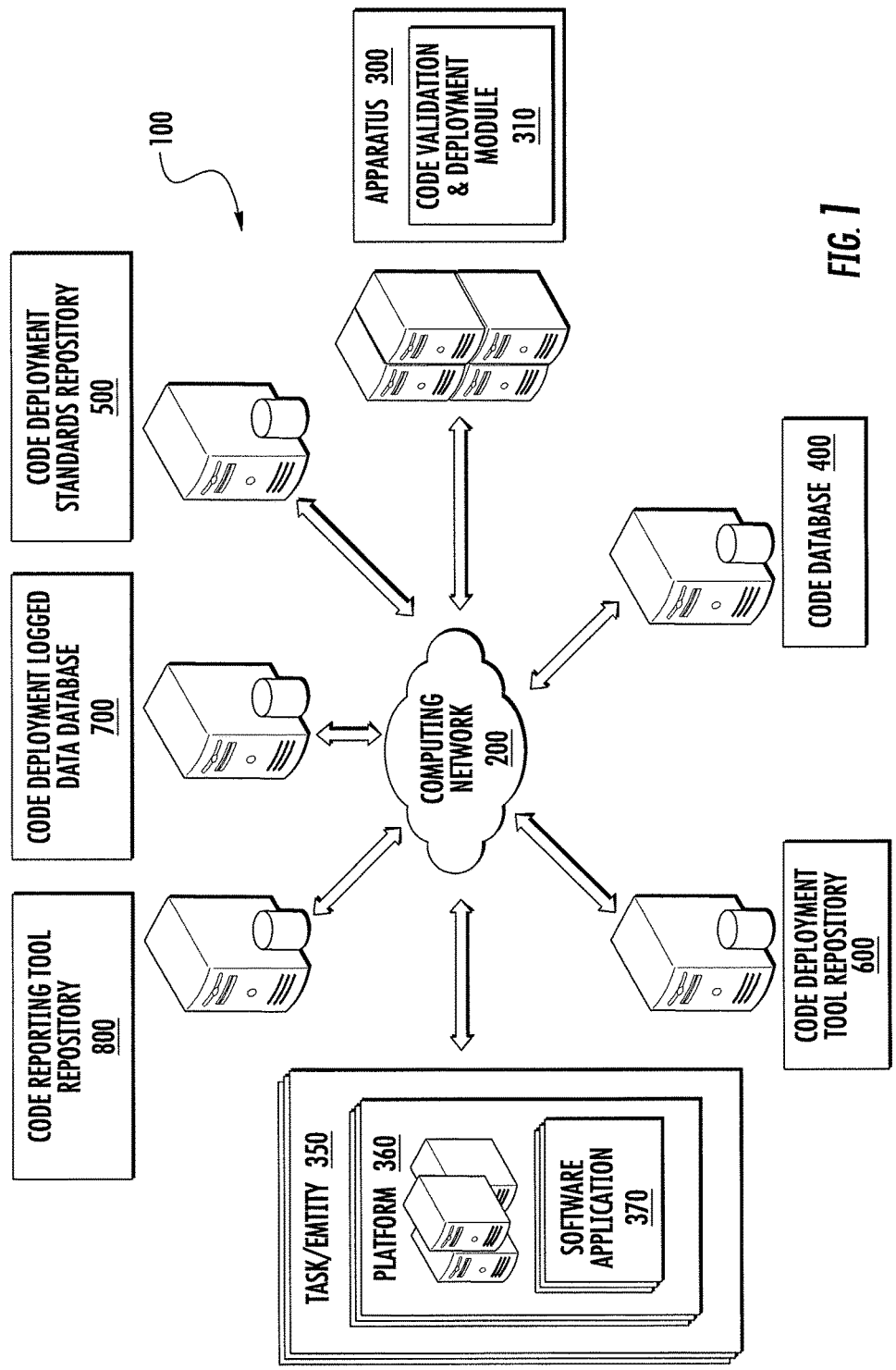
Figure 2:
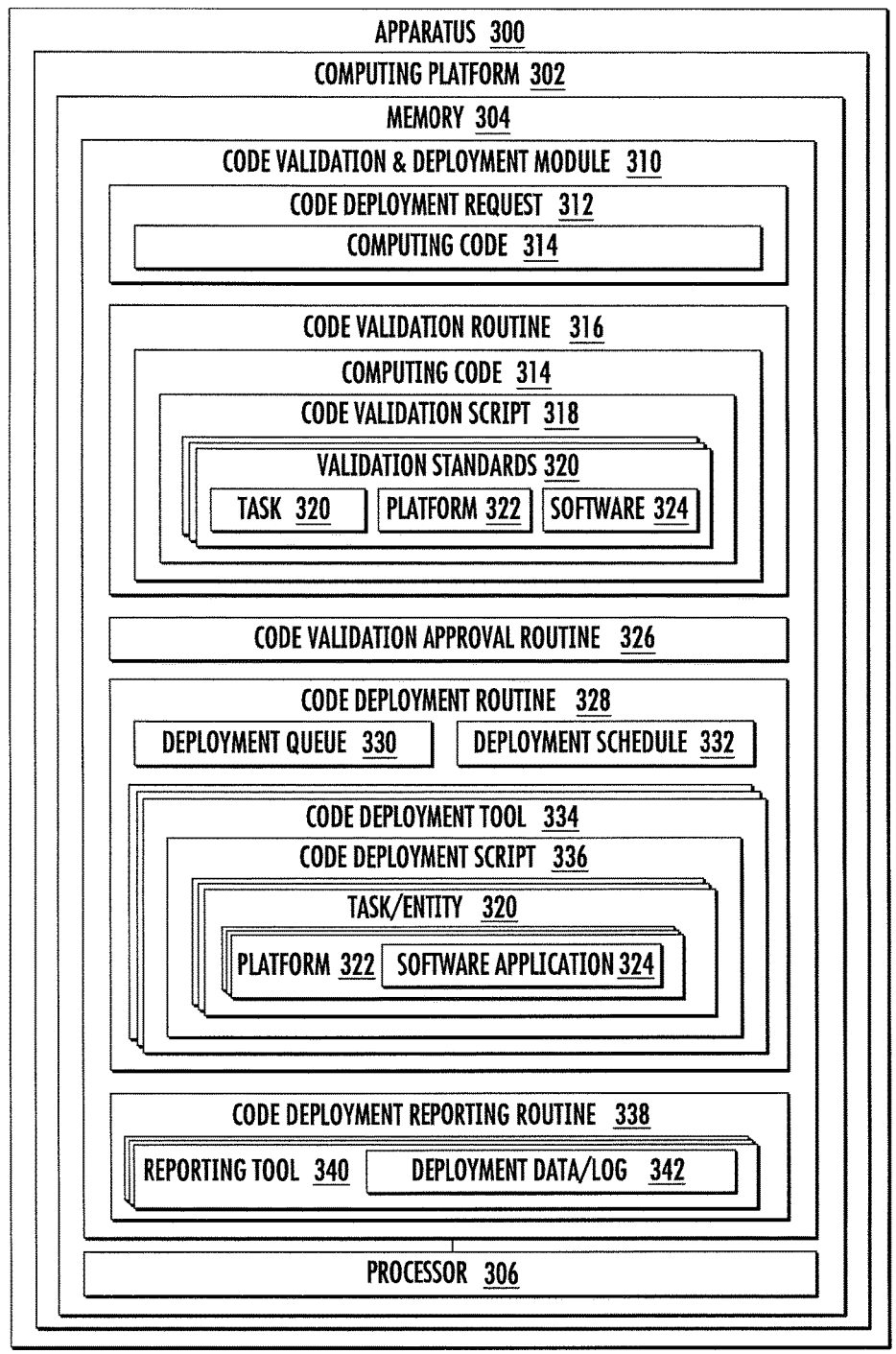
Figure 3:
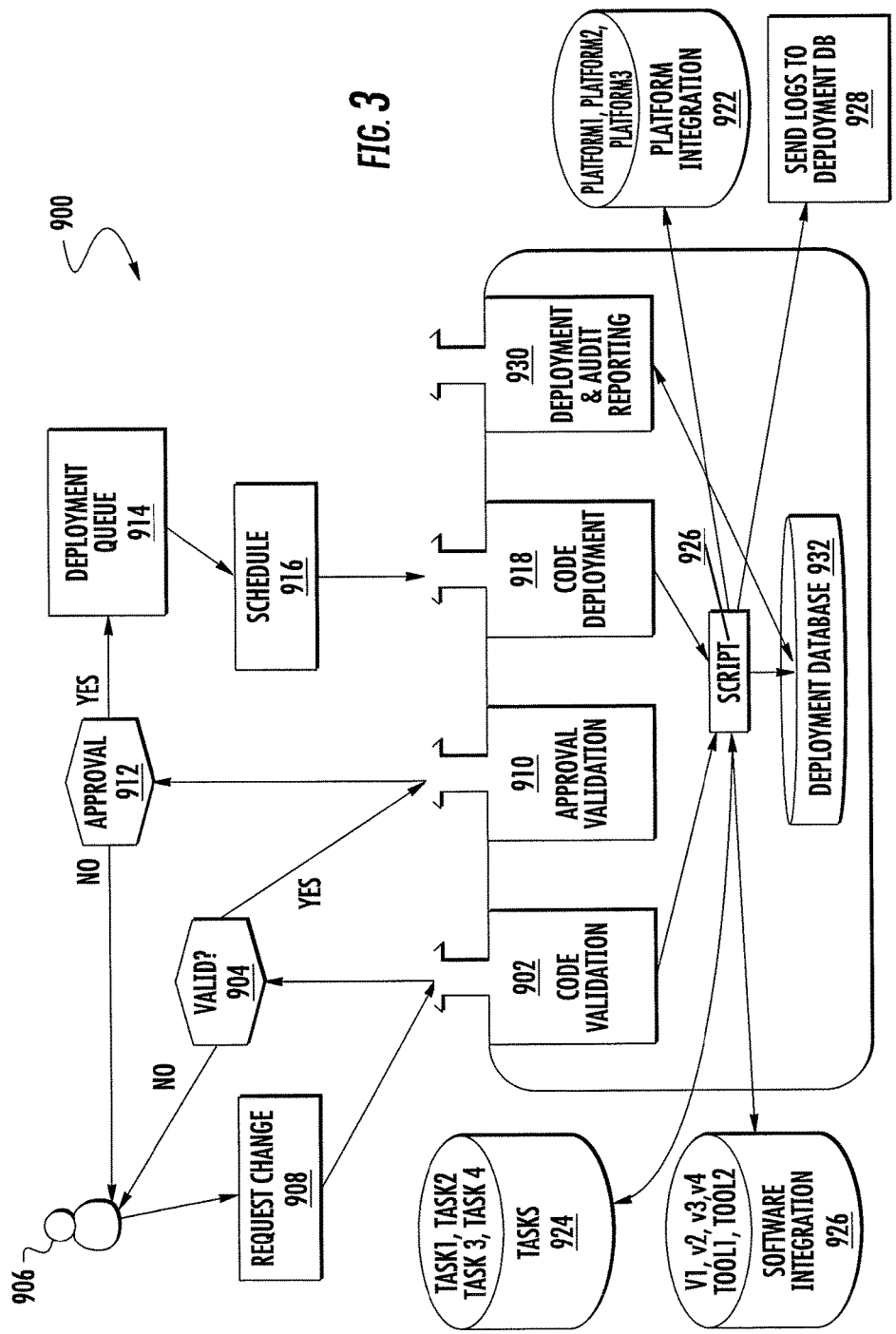

Having thus described embodiments of the invention in general terms, reference will now be made to the accompanying drawings, which are not necessarily drawn to scale, and wherein:

FIG. 1 provides a schematic diagram of an exemplary system for code validation and deployment, in accordance with embodiments of the present invention;

FIG. 2 provides a block diagram of an apparatus for code validation and deployment, in accordance with embodiments of the present invention; and FIG. 3 provides a more combined flow and schematic diagram for a method for code validation and deployment, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for a unified interface for flexible and customizable code deployment. In this regard, the present invention centralizes the management of all facets of code deployment, including code validation, validation approval, code deployment and data reporting/auditing.

In terms of code validation, a user is able to select or the system is configured to determine which validation standards apply based on the entities, platforms and/or applications associated with a code deployment. The unified interface provides for automated validation to occur regardless of the ticketing process, the version/revision control process, and/or the platforms/applications to which the code is to be deployed.

In addition, the unified nature of the present invention means that any known, or future known, code deployment tool (i.e., method of deployment) and/or reporting/auditing tool can be selected by a user and implemented for a specified code deployment/migration. Moreover, such code deployment and generation of reports occurs automatically with minimal, in some instances no, manual intervention.

Additionally, embodiments of the present invention are capable of integrating with any new/future platform, new/future software applications/packages and/or updates/revisions to applications/software packages without having to modify or reconfigure the unified code deployment interface.

Further, by unifying the entire code deployment process, the present invention is capable of logging/tracking every action/event that occurs throughout the validation and deployment process. Such comprehensive logging and tracking of events provides robust data for subsequent data analysis and provides for a comprehensive audit trail of the validation and deployment process.

Referring to FIG. 1, a schematic diagram is provided of a system 100 for validation and deployment of computing code, in accordance with embodiments of the present invention. The system 100 described herein is especially suited for large enterprises that require a high volume of code deployments that implement diverse code deployment tools; however, the system has applicability in any computing environment. The system includes apparatus 300, which may comprise multiple computing devices, such as multiple servers or the like. Apparatus 300 stores and provides access to code validation and deployment module 310, which provides users a unified, singular interface for code validation and deployment across an entire computing network 200. In this regard, the code validation and deployment module 300 is capable of implementing and managing all facets of any and all code deployments conducted throughout the computing network 200. For example, the code validation and deployment module 300 is capable of implementing and managing code validation, validation approval, code deployment and reporting through one consolidated interface.

System 100 additionally includes code database 400, which stores the codes that are to be deployed. The computing code may be associated with new software (e.g., applications, tools, modules and the like) previously not implemented within the computing network 200 or the computing code may be associated with updates/revisions to existing software (e.g., applications, tools, modules and the like). Once a user requests a code deployment, the code validation and deployment module 310 accesses the code database 400 to retrieve the code and the code deployment standards repository 500 to retrieve applicable standards and conducts a code validation.

Code deployment standards repository 500, stores standards, regulations and the like that define the requirements needed for deployment. The standards may be internal to the enterprise or external to the enterprise (e.g., government standards/regulations or the like). Moreover, the standards may be specific to the program/entity 350 implementing the deployment, the platforms 360 (e.g., operating systems and/or specific computing devices) to which the code will be deployed and/or the software/applications 370 associated with the code. As such, code validation and deployment module 300 is configured to identify which standards apply to a specific deployment based, at least, on the task (i.e., project) 350, the platforms 360 and the applications 370 applicable to the deployment. In specific embodiments of the invention, the deployment request will include a task identifier (ID). The task ID is configured such that it tied to the platforms and applications associated with the task. Thus, the code validation and deployment module 300 is configured to identify the task, platforms and applicable software applications and, as a means of code validation, apply the standards associated with the identified task, platforms and software applications.

System 100 additionally includes code deployment tool repository 600, which stores and provides access to a plurality of different code deployment tools. The code deployment tools, otherwise referred to as ETL (Extract, Transform and Load) tools, may be commercial off-the-shelf products that are specific to the code being deployed, a platform and/or software application. In specific embodiments of the invention the user/requester may identify which code deployment tools are applicable to the requested code deployment, while in other embodiments of the invention, the code validation and deployment module 310 may be configured to identify which code deployment tool(s) are applicable to a requested code deployment based on the code being deployed and/or the task ID. Thus, in response to successful completion of the code validation process, including validation approval, the code validation and deployment module 310 access code deployment tool repository 600 to retrieve applicable code deployment tools that are triggered for executing the code deployment process.

System 100 additionally includes code deployment logged data database 700 that stores a log, captured by the code validation and deployment module 310, for each code deployment process. The log tracks and records data related to each and every action conducted during a code deployment process. The logged data provides for efficient and unified data analysis and a comprehensive audit trail. Additionally, system 100 includes code deployment reporting tool repository 800 which stores and provides access to a plurality of different reporting tools. The reporting tools may be commercial off-the-shelf products or custom reporting tool. In specific embodiments of the invention the user/requester may identify the reporting tools applicable to the requested code deployment, while in other embodiments of the invention, the code validation and deployment module 310 may be configured to identify which reporting tool(s) are applicable to a requested code deployment based on the code being deployed and/or the task ID. As such, in response to completion of the code deployment process, the code validation and deployment module 300 may be configured to access the log associated with the code deployment and the applicable reporting tools to trigger generation of requisite reports and, where applicable, initiate electronic communication of the reports to designated parties/entities.

Referring to FIG. 2 a block diagram is presented of the apparatus 300, which is configured for providing automated code validation and deployment, in accordance with embodiments of the present invention. In addition to providing greater detail, FIG. 2 highlights various alternate embodiments of the invention. The apparatus 300 may include one or more of any type of computing device, such as a server or the like. The present apparatus and methods can accordingly be performed on any form of one or more computing devices.

The apparatus 300 includes a computing platform 302 that can receive and execute algorithms, such as routines, and applications. Computing platform 302 includes memory 304, which may comprise volatile and non-volatile memory, such as read-only and/or random-access memory (RAM and ROM), EPROM, EEPROM, flash cards, or any memory common to computer platforms. Further, memory 304 may include one or more flash memory cells, or may be any secondary or tertiary storage device, such as magnetic media, optical media, tape, or soft or hard disk. Moreover, memory 304 may comprise cloud storage, such as provided by a cloud storage service and/or a cloud connection service.

Further, computing platform 302 also includes processor 306, which may be an application-specific integrated circuit ("ASIC"), or other chipset, processor, logic circuit, or other data processing device. Processor 306 or other processor such as ASIC may execute an application programming interface ("API") (not shown in FIG. 2) that interfaces with any resident programs, such as code validation and deployment module 310 and routines, sub-modules associated therewith or the like stored in the memory 304 of the apparatus 300.

Processor 306 includes various processing subsystems (not shown in FIG. 2) embodied in hardware, firmware, software, and combinations thereof, that enable the functionality of apparatus 300 and the operability of the apparatus on a network. For example, processing subsystems allow for initiating and maintaining communications and exchanging data with other networked devices, such as those apparatus, databases and repositories shown in FIG. 1. For the disclosed aspects, processing subsystems of processor 306 may include any subsystem used in conjunction with code validation and deployment module 310 and related algorithms, sub-algorithms, modules, sub-modules thereof.

Computer platform 302 may additionally include communications module (not shown in FIG. 2) embodied in hardware, firmware, software, and combinations thereof, that enables communications among the various components of the apparatus 300, as well as between the other networked devices. Thus, communication module may include the requisite hardware, firmware, software and/or combinations thereof for establishing and maintaining a network communication connection.

The memory 304 of apparatus 300 stores code validation and deployment module 310, which is a unified single interface for conducting code validation and deployment throughout an enterprise's computing network, in accordance with embodiments of the invention. The module 310 is configured to initiate the code validation and deployment in response to a code deployment request 312 to deploy computing code 314. The code deployment request 312 may be received from a user through a user interface produced by the module 310 or, in alternate embodiments of the invention, another application or module in network communication with the module 310 may provide the code deployment request 312. At a minimum, the code deployment request 312 will identify the computing code and include a task identifier(s) (ID), which identify the tasks/entities that pertain to the deployment. The task ID may be configured such that is tied to the platform(s) and/or software application on which the code will be deployed. Alternatively, in some embodiments the code deployment request 312 may include identification of the platform(s) and/or software application(s). The computing code 314 may include a revision/update to an existing software application, a new software application or the like.

Code validation and deployment module 310 includes code validation routine 316, which, upon receipt of the code deployment request, executes a code validation script that applies one or more code validation standards 320 to the computing code 314. The code validation routine 316 is configured to apply any and all code validation standards 320 that are required of the computing code 314. The code validation standards 320 may include any internal standard or external standard (e.g., government regulations or the like). Further, the standards may be associated with any facet of the code deployment including, but not limited to, the task(s) 320, the platform(s) 322 and the software applications 324. In specific embodiments of the invention the code validation routine is configured to automatically determine and apply requisite validation standards 320 to the computing code 314. In such embodiments, the code deployment request 312 may include information that identifies the applicable validation standards (e.g., task ID or the like) or, in alternate embodiments, the request 312 itself may include the applicable validation standards 320.

In the event that the code validation routine 316 determines that the computing code 314 is invalid (i.e., does not pass/meet the requirements of the applicable validation standard(s) 320), the module 310 is configured to automatically initiate a change request and change process prior to resubmission of the revised/changed computing code to the code validation process. In the event that the code validation routine 316 determines that the computing code 314 is valid (i.e., passes/meets the requirements of the applicable standard(s)), the module 310 is configured to initiate a code validation approval routine 326, which is configured to generate approval notifications and initiate electronic communication of the same to designated individual/entities, track the approval and insure that the code 314 is not deployed until proper approval has been granted.

Code validation and deployment module 310 additionally includes code deployment routine 328, which, upon validation approval, places the code deployment in deployment queue 330 and subsequently executes the deployment according to predetermined deployment schedule 332. The deployment schedule may be in accordance with parameters inputted during the code deployment request 312 or inputted thereafter, or, in alternate embodiments of the invention, the module 310 may be configured to determine a recommended deployment schedule based on network load, deployment requirements and the like. Further, code deployment routine 328 is configured to triggers execution of one or more code deployment tools 334 which are configured to execute a code deployment script 336 for deploying the code 314 across tasks 320, platforms 322 and software applications 324. Further, the code deployment routine 328 is configured to identify which task(s) 320, platforms 322 and software applications 324 require deployment of the code 314. In specific embodiments of the invention, the code deployment routine 328 is configured to identify the task(s) 320, platforms 322 and software applications 324 based on task identifier (ID) received as part of the code deployment request 312. As previously noted the code deployment tools 334 may be any known, or future known, commercial off-the-shelf code deployment tools or the code deployment tools may be a custom developed tool. In specific embodiments of the invention the code deployment routine 328 is configured to automatically determine and apply applicable code deployment tools 334 to deploy the computing code 314. In such embodiments, the code deployment request 312 may include information that identifies the applicable code deployment tool(s) (e.g., task ID or the like) or, in alternate embodiments, the request 312 itself may include the code deployment tool(s) 334.

In additional embodiments of the invention, code validation and deployment module 310 is configured to log each and every action taken by the code deployment process, such that, a comprehensive deployment data log 342 exists for each code deployment. The deployment data log 342 includes data associated with each event conducted by the code validation routine 316, the code validation approval routine 326, and the code deployment routine 318, as well as, events conducted by associated code deployment tools 334. The comprehensive nature of the deployment data logs 334 are beneficial to providing a requisite audit trail for every facet of the code validation and deployment process.

In additional embodiments of the invention, code validation and deployment module 310 includes code deployment reporting routine 338 that is configured to execute any one or more of a plurality of reporting tools 340 to generate reports needed for further data analysis and or auditing purposes. The reporting tools 240 may be any known, or future known, commercial off-the-shelf code reporting tools or the reporting tools may be a custom developed reporting tool. In specific embodiments of the invention the code deployment reporting routine 338 is configured to automatically determine and apply applicable code reporting tools 334. In such embodiments, the code deployment request 312 may include information that identifies the applicable code reporting tools (e.g., task ID or the like) or, in alternate embodiments, the request 312 itself may include the code reporting tool(s) 340.

Referring to FIG. 3, shown is modified schematic and flow diagram that is illustrative of a methodology for automated code validation and deployment in accordance with embodiments of the present invention. In response to receiving a code validation and deployment request, at Event 902, a code validation process occurs. A code validation script is executed that applies one or more code validation standards to the computing code. The code validation process is configured to apply any and all code validation standards that are required of the deployment process. The code validation standards that are applied may include any internal standard or external standard (e.g., government regulations or the like). Further, the standards may be associated with any facet of the code deployment including, but not limited to, the task(s), the platform(s) and/or the software applications to which the code is to be deployed. In specific embodiments of the invention, the code validation process is configured to automatically determine and apply requisite validation standards to the computing code.

At Decision 904, based on the outcome of the code validation process 902, a determination is made as to whether the code is valid. If the code validation process 902 results in the code being determined to be invalid the code is returned to the user/responsible entity 906 and, at Event 908, a change request is processed to address the problems with the code (i.e., the reasons why the code was invalidated). In response to making the change/addressing the problems, at Event 902, the code is returned to the code validation process. If the code validation process results in the code being determined to be valid, at Event 910, the validation approval process occurs. The validation approval process provides for generating appropriate approval notification, electronically communicating the notifications to designated approval individuals/parties, tracking the approvals to insure approval response and the like.

At Decision 912, a determination is made as to whether the validation has been approved. If the approval validation process 910 results in the determination that approval has not been granted (e.g., one or more of the designated approval individuals/entities does not approve of the validation), the code is returned to the user/responsible entity 906 and, at Event 908, a change request is processed to address the problems with the code (i.e., the reasons why the approval was not granted). In response to making the change/addressing the approval issues, at Event 902, the code is returned to the code validation process. If the code validation approval process results in the validation being approved, at Event 914, the code is placed in a deployment queue and, at Event 916 a predetermined deployment schedule is implemented to trigger deployment. The deployment schedule may be in accordance with parameters inputted during the code deployment request or inputted thereafter, or, in alternate embodiments of the invention, a recommended deployment schedule may be determined based on network load, deployment requirements and the like.

At Event 918, code deployment executes a code deployment script 920 that triggers execution of one or more code deployment tools, which are configured to deploy the code across one or more tasks 924, one or more platforms 922 (i.e., operating systems, specific devices and the like) and software applications 926 (i.e., specific applications/tools and/or specific revisions/versions of applications/tools). In specific embodiments of the invention, the task(s) 924, platforms 922 and software applications 926 that require code deployment are identified on a task identifier (ID) or other identifiers received as part of the code deployment request. In specific embodiments of the invention the code deployment process is configured to automatically determine and apply the applicable code deployment tools. In such embodiments, the code deployment request may include information that identifies the applicable code deployment tool(s) (e.g., task ID or the like) or, in alternate embodiments, the request itself may include the code deployment tool(s).

At Event 928, all actions taken by the code validation scripts and the code deployment scripts are logged and, upon completion of the code deployment process, the log is communicated to and stored within deployment database 932.

At Event 930, a code deployment reporting process is executed that executes any one or more of a plurality of reporting tools to generate reports needed for further data analysis and or auditing purposes. In specific embodiments of the invention the code deployment reporting process is configured to automatically determine and apply applicable code reporting tools. In such embodiments, the code deployment request may include information that identifies the applicable code reporting tools (e.g., task ID or the like) or, in alternate embodiments, the request itself may include the code reporting tool(s).

Thus, systems, apparatus, methods, and computer program products described above provide for a unified, single interface for flexible and customizable code deployment. The present invention provides for centralized management and automation of all phases of code deployment; including, but not limited to, code validation, validation approval, code deployment and data reporting/auditing. In this regard, the present invention is capable of automatically validating code regardless of which standards and/or regulations apply to the programs/entities, platforms and/or software applications associated with a given deployment. In addition, the present invention provides for any known, or future known, code deployment tool (i.e., method of deployment) and/or reporting/auditing tool to be implemented as a means of conducting the code deployment and/or generating requisite reports or audit trails. Additionally, the present invention is capable of integrating with any new/future platform, new/future software applications/packages and/or updates/revisions to applications/software packages without having to modify or reconfigure the disclosed invention. Further the present invention logs/tracks every action/event that occurs throughout the validation and deployment process, so that resulting data provides requisite analysis and audit trials.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for code validation and deployment, the apparatus comprising:
   a computing platform having a memory and at least one processor in communication with the memory; and
   a code validation and deployment module stored in the memory, executable by the processor and configured to:
   receive a user request to deploy a code within a computing network, wherein the user request includes a task identifier tied to one or more computing platforms, software applications and tasks that pertain to the deployment and is used to associate deployment of the code with one or more tasks, one or more computing platforms, one or more applications, one or more validation standards, one or more deployment tools,
   automatically identify and apply one or more of a plurality of code validation standards comprising at least one of an internal or external standard, wherein the validation standards that are applied are identified based on the one or more validation standards associated with the received task identifier, and
   in response to validation and approval of the validation, automatically determine at least one code deployment tool for deploying the code based on the one or more code deployment tools associated with the received task identifier, and automatically deploy the code through execution of the one or more code deployment tools, wherein deploying includes:
   queuing and scheduling the code for deployment, and
   executing a deployment script that is configured to identify the tasks associated with the code deployment based at least on the one or more tasks associated with the received task identifier, and determine the computing platforms and the applications associated with the code deployment based at least on the one or more computing platforms associated with the received task identifier and the one or more applications associated with the received task identifier, and, in accordance with the scheduling, deploy the code across the one more tasks, across the one or more computing platforms and the one or more applications.

2. The apparatus of claim 1, wherein the code validation and deployment module is further configured to log data associated with actions performed by the code validation and deployment module and store the logged data in a code deployment database.

3. The apparatus of claim 2, wherein the code validation and deployment module is further configured to receive user selection of one or more of a plurality of code deployment reporting tools and, in response to completion of a code deployment, access the code deployment database to retrieve applicable logged data and, execute the one or more code deployment reporting tools to generate and initiate communication of one or more code deployment reports.

4. The apparatus of claim 1, wherein the code validation and deployment module is further configured to automatically approve the validation of the code based on user selected approval criteria.

5. The apparatus of claim 1, wherein the code validation and deployment module is further configured to deploy the code by executing the deployment script that identifies the computing platforms associated with the code deployment, wherein the computing platforms include at least one of operating systems and computing devices.

6. The apparatus of claim 1, wherein the code validation and deployment module is further configured to deploy code to any previously unidentified computing platforms added to the computing network absent a modification to the code validation and deployment module.

7. The apparatus of claim 1, wherein the code validation and deployment module is further configured to deploy code to any previously unidentified applications and previously unidentified versions of applications absent a modification to the code validation and deployment module.

8. A system for code validation and deployment, the system comprising:
   a plurality of code deployment tools;
   a plurality of code validation standards;
   a computing platform having a memory and at least one processor in communication with the memory; and
   a code validation and deployment module stored in the memory, executable by the processor and configured to:
   receive a user request to deploy a code within a computing network, wherein the user request includes a task identifier tied to one or more computing platforms, software applications and tasks that pertain to the deployment and is used to associate deployment of the code with one or more tasks, one or more computing platforms, one or more applications, one or more validation standards, one or more deployment tools,
   automatically identify and apply one or more of a plurality of code validation standards comprising at least one of an internal or external standard, wherein the validation standards that are applied are identified based on the one or more validation standards associated with the received task identifier, and
   in response to validation and approval of the validation, automatically determine at least one code deployment tool for deploying the code based on the one or more code deployment tools associated with the received task identifier, and automatically deploy the code through execution of the one or more code deployment tools, wherein deploying includes:
   queuing and scheduling the code for deployment, and
   executing a deployment script that is configured to identify the tasks associated with the code deployment based at least on the one or more tasks associated with the received task identifier, and determine the computing platforms and the applications associated with the code deployment based at least on the one or more computing platforms associated with the received task identifier and the one or more applications associated with the received task identifier, and, in accordance with the scheduling, deploy the code across the one more tasks, across the one or more computing platforms and the one or more applications.

9. The system of claim 8, further comprising a code deployment log database and wherein the code validation and deployment module is further configured to log data associated with actions performed by the code validation and deployment module and store the logged data in the code deployment log database.

10. The system of claim 9, further comprising a plurality of code deployment reporting tools, wherein the code validation and deployment module is further configured to, in response to completion of a code deployment, access the code deployment database to retrieve applicable logged data and, execute one or more of a plurality of code deployment reporting tools to generate and initiate communication of one or more code deployment reports.

11. The system of claim 8, wherein the code validation and deployment module is further configured to deploy the code by executing the deployment script that determines the computing platforms associated with the code deployment, wherein the computing platforms include at least one of operating systems and computing devices.

12. The system of claim 8, wherein the code validation and deployment module is further configured to deploy code to any previously unidentified computing platforms added to the computing network absent a modification to the code validation and deployment module.

13. The system of claim 8, wherein the code validation and deployment module is further configured to deploy code to any previously unidentified applications and previously unidentified versions of applications absent a modification to the code validation and deployment module.

14. A computer program product including a non-transitory computer-readable medium, the computer-readable medium comprising:
   a first set of codes for causing a computer to receive a user request to deploy a code within a computing network, wherein the user request includes a task identifier tied to one or more computing platforms, software applications and tasks that pertain to the deployment and is used to associate deployment of the code with one or more tasks, one or more computing platforms, one or more applications, one or more validation standards, one or more deployment tools;
   a second set of codes for causing a computer to automatically identify and apply one or more of a plurality of code validation standards comprising at least one of an internal or external standard, wherein the validation standards that are applied are identified based on the one or more validation standards associated with the received task identifier; and
   a third set of codes for causing a computer to, in response to validation and approval of the validation, automatically determine at least one code deployment tool for deploying the code based on the one or more code deployment tools associated with the received task identifier, and automatically deploy the code through execution of the one or more code deployment tools, wherein deploying includes (i) queuing and scheduling the code for deployment, and (ii) executing a deployment script that is configured to identify the tasks associated with the code deployment based at least on the one or more tasks associated with the received task identifier, and determine the computing platforms and the applications associated with the code deployment based at least on the one or more computing platforms associated with the received task identifier and the one or more applications associated with the received task identifier, and, in accordance with the scheduling, deploy the code across the one more tasks, across the one or more computing platforms and the one or more applications.

15. The computer program product of claim 14, wherein the computer-readable medium further includes a fourth set of codes for causing a computer to log data associated with actions performed by the code validation and deployment module and store the logged data in a code deployment database.

16. The computer program product of claim 15, wherein the fourth set of codes is further configured to cause the computer to, in response to completion of a code deployment, access the code deployment database to retrieve applicable logged data and, execute the one or more code deployment reporting tools to generate and initiate communication of one or more code deployment reports.

17. The computer program product of claim 14, further comprising a fourth set of codes for causing a computer to, in response to validating the code, automatically approve the validation of the code based on user selected approval criteria.

18. The computer program product of claim 14, wherein the third set of codes is further configured to cause the computer to deploy the code by executing the deployment script that identifies the computing platforms associated with the code deployment, wherein the computing platforms include at least one of operating systems and computing devices.

19. The computer program product of claim 14, further comprising a fourth set of codes for causing a computer to deploy code to any previously unidentified computing platforms added to the computing network absent a modification to the code validation and deployment module.

20. The computer program product of claim 14, further comprising a fourth set of codes for causing a computer to deploy code to any previously unidentified applications and previously unidentified versions of applications absent a modification to the code validation and deployment module.

* * * * *